US011813219B2

(12) United States Patent
Ley et al.

(10) Patent No.: US 11,813,219 B2
(45) Date of Patent: Nov. 14, 2023

(54) POWERED EXOSKELETON WRIST COMPONENT

(71) Applicant: Ford Global Technologies, LLC, Dearborn, MI (US)

(72) Inventors: Jeffrey John Ley, Brighton, MI (US); Ian George Eickholdt, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 583 days.

(21) Appl. No.: 17/009,947

(22) Filed: Sep. 2, 2020

(65) Prior Publication Data

US 2022/0062086 A1 Mar. 3, 2022

(51) Int. Cl.
  *B25J 9/00* (2006.01)
  *A61H 1/02* (2006.01)
  *A61H 3/00* (2006.01)

(52) U.S. Cl.
  CPC .............. *A61H 1/0274* (2013.01); *A61H 3/00* (2013.01); *A61H 2201/1207* (2013.01);
  (Continued)

(58) Field of Classification Search
  CPC ........ A61H 1/0274; A61H 1/00; A61H 1/001; A61H 1/02; A61H 1/0237; A61H 1/024; A61H 1/0244; A61H 1/0255; A61H 1/0259; A61H 1/0262; A61H 2201/0251; A61H 2201/0248; A61H 2201/0259; A61H 3/00;
  (Continued)

(56) References Cited

U.S. PATENT DOCUMENTS

| 4,669,451 A | * | 6/1987 | Blauth | A61F 5/013 482/901 |
| 5,355,743 A | * | 10/1994 | Tesar | B25J 9/126 475/341 |

(Continued)

FOREIGN PATENT DOCUMENTS

| CN | 109276410 | * | 1/2019 | ........... A61H 1/0214 |
| KR | 20140120764 | * | 10/2014 | ............... A61F 4/00 |

OTHER PUBLICATIONS

Higways Today, Sarcos Overcomes Major Obstacle to Deployment of Full-body, Powered Industrial Exoskeletons, Sarcos Robotics, pp. 1-3.

*Primary Examiner* — Bradley H Philips
*Assistant Examiner* — Savannah L Gabriel
(74) *Attorney, Agent, or Firm* — Burris Law, PLLC

(57) ABSTRACT

An exoskeleton component includes a wrist base structure, wrist intermediate structure, and end effector support structure. A first driveline output is disposed about a first axis. The first driveline output is coupled to the wrist intermediate structure for common rotation relative to the wrist base structure. A first motor drives the first driveline output to rotate. A second driveline output is disposed about a second axis that is transverse the first axis. The second driveline output is coupled to the end effector support structure for common rotation relative to the wrist intermediate structure. A second motor drives the second driveline output to rotate. An input device is coupled to the wrist base structure. A controller is configured to receive input signals from the input device and to control the first motor and the second motor in response to the input signals.

20 Claims, 6 Drawing Sheets

(52) U.S. Cl.
CPC ............... *A61H 2201/149* (2013.01); *A61H 2201/1635* (2013.01); *A61H 2201/5025* (2013.01)

(58) Field of Classification Search
CPC .. A61F 5/0188; A61F 5/05866; A61F 5/3723; A61F 5/3761; A61F 5/373; A61F 5/0102; A61F 5/013; B25J 9/0006; B25J 18/007; B25J 17/02; A61B 90/50; A61B 34/70; A61B 34/74; A61B 34/76; A61B 2034/305
See application file for complete search history.

(56) References Cited

U.S. PATENT DOCUMENTS

| | | | |
|---|---|---|---|
| 6,301,526 B1 * | 10/2001 | Kim | B25J 9/0006 74/490.06 |
| 7,410,338 B2 | 8/2008 | Schiele et al. | |
| 8,641,782 B2 | 2/2014 | Kim et al. | |
| 2003/0223844 A1 * | 12/2003 | Schiele | A63B 23/12 414/5 |
| 2007/0225620 A1 * | 9/2007 | Carignan | B25J 17/025 601/5 |
| 2007/0288044 A1 * | 12/2007 | Jinno | A61B 34/70 606/174 |
| 2011/0066088 A1 * | 3/2011 | Little | A61H 3/00 601/35 |
| 2012/0328395 A1 * | 12/2012 | Jacobsen | B25J 13/025 414/1 |
| 2013/0013108 A1 * | 1/2013 | Jacobsen | B25J 3/04 700/250 |
| 2018/0055591 A1 | 3/2018 | Bonny et al. | |
| 2018/0133905 A1 * | 5/2018 | Smith | F16D 25/14 |
| 2020/0246209 A1 * | 8/2020 | Bosio | A61H 1/0281 |

* cited by examiner

POWERED EXOSKELETON WRIST COMPONENT

FIELD

The present disclosure relates to powered exoskeleton components.

BACKGROUND

The statements in this section merely provide background information related to the present disclosure and may not constitute prior art.

A powered exoskeleton suit can be worn by an operator to assist in doing operations such as lifting. Typically, the exoskeleton suit has two arms that end at corresponding left and right grip portions. Each grip portion typically has a grip handle and the operator must hold each grip handle with his or her corresponding left or right hand to operate the exoskeleton. In some configurations, the operator can move the arms by physically moving the grip handles and the arms of the exoskeleton include motors that can increase the operator's capabilities. Typically, end effectors, such as hooks for example, are rigidly mounted to the grip portions to permit the operator to pick up objects. However, it can be difficult to pick up objects with such end effectors if the objects are not precisely aligned with the grip portion.

The present disclosure addresses these and other issues associated with powered exoskeleton components.

SUMMARY

In one form, an exoskeleton component includes a wrist base structure, a wrist intermediate structure, an end effector support structure, a first driveline, a second driveline, an input device, and a controller. The first driveline includes a first motor and a first output member. The first output member is disposed about a first axis. The first output member is coupled to the wrist intermediate structure for common rotation about the first axis relative to the wrist base structure. The first motor is drivingly coupled to the first output member to rotate the first output member about the first axis. The second driveline includes a second motor and a second output member. The second output member is disposed about a second axis that is transverse the first axis. The second output member is coupled to the end effector support structure for common rotation about the second axis relative to the wrist intermediate structure. The second motor is drivingly coupled to the second output member to rotate the second output member about the second axis. The input device is coupled to the wrist base structure. The controller is in electrical communication with the first motor, the second motor, and the input device and configured to receive input signals from the input device and to control the first motor and the second motor in response to the input signals. According to a variety of alternate forms: the exoskeleton component further includes a power storage device coupled to the wrist base structure and connected for electrical communication with the controller, the first motor, and the second motor; the input device includes a joystick, a button, a switch, or combinations thereof; the end effector support structure includes an end effector mount configured to releasably connect to an end effector; the exoskeleton component further includes an end effector coupled to the end effector support structure; at least one of the first driveline and the second driveline includes a self-locking gearset; the first driveline includes a worm and a worm gear, the worm being coupled to an output of the first motor, the worm gear being meshingly engaged with the worm and coupled to the first output member; the exoskeleton component further including a third driveline including a third motor drivingly coupled to the second output member to rotate the second output member about the second axis; the second driveline includes an input gear and an output gear, the input gear of the second driveline being drivingly coupled to an output of the second motor, the output gear of the second driveline being meshingly engaged to the input gear of the second driveline and coupled to the end effector support structure for common rotation about the second axis; the exoskeleton component further including a cover, the cover being coupled to the wrist intermediate structure and enclosing the input gear of the second driveline and the output gear of the second driveline; the exoskeleton component further including a grip handle configured to be gripped by a hand of an operator, the grip handle being disposed proximate the input device to permit the operator to engage the input device with the hand while also gripping the grip handle with the hand; the grip handle is disposed about a third axis that is transverse the first axis and the second axis; the controller is supported for movement with the wrist base structure; the exoskeleton component further including an exoskeleton arm coupled to the wrist base structure for movement therewith, the exoskeleton arm being configured to be attached to an arm of an operator form movement therewith.

According to another form, an exoskeleton component for an exoskeleton arm including a grip handle coupled to the arm and configured to be gripped by a hand of an operator, the exoskeleton component including a wrist base structure, a wrist intermediate structure, an end effector support structure, a first driveline, a second driveline, an input device, and a controller. The wrist base structure is coupled to the arm for movement therewith. The first driveline includes a first motor and a first gearset. The first gearset is drivingly coupled to the first motor and configured to rotate the wrist intermediate structure relative to the wrist base structure about a first axis upon operation of the first motor. The second driveline includes a second motor and a second gearset. The second gearset is drivingly coupled to the second motor and configured to rotate the end effector support structure relative to the wrist intermediate structure about a second axis upon operation of the second motor. The second axis is transverse the first axis. The input device is coupled to the arm and disposed proximate the grip handle. The controller is configured to receive input signals from the input device and to control the first motor and the second motor to operate the first motor and the second motor in response to the input signals. According to a variety of alternate forms: the first motor is supported for movement with the arm and the second motor is supported by the wrist intermediate structure for movement therewith; the first gearset includes a worm and a worm gear, the worm is configured to transfer torque from the first motor to the worm gear and the worm gear is configured to rotate the wrist intermediate structure about the first axis; the second motor is supported by the wrist intermediate structure; the second driveline further includes a third motor and a third gearset, the third gearset drivingly coupled to the third motor and configured to rotate the end effector support structure relative to the wrist intermediate structure about the second axis upon operation of the third motor; the exoskeleton component further includes a power storage device coupled to the arm and connected for electrical communication with the controller, the first motor, and the second motor.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
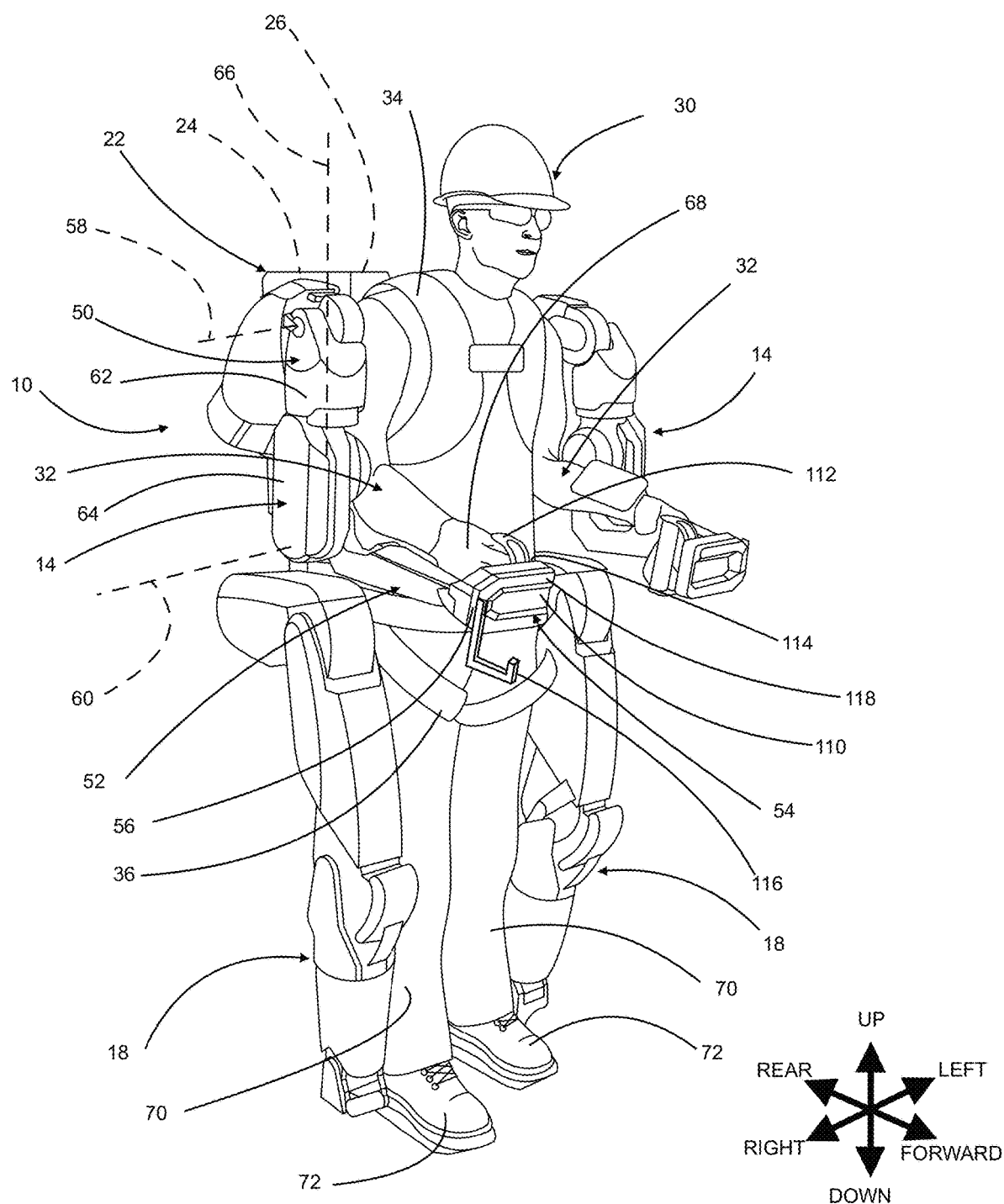
FIG. 1 is a front perspective view of an example exoskeleton in accordance with the teachings of the present disclosure, illustrating an operator wearing the exoskeleton.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, an example exoskeleton 10 is illustrated. The exoskeleton 10 includes at least one powered arm 14. In the example provide, the exoskeleton 10 includes both a left powered arm 14 and a right powered arm 14 (the left and right powered arms are collectively referred to herein as the powered arms 14). The exoskeleton 10 may also optionally include a pair of powered legs 18. The powered arms 14 and powered legs 18 can be coupled together by a body portion 22. The body portion 22 may optionally include a power storage unit 24 (e.g., a battery) and/or a control module 26 configured to control operation of the powered arms 14 and powered legs 18. In an alternative configuration, the body portion 22 may be coupled to an external power source and/or an external control module.

The exoskeleton 10 is configured to be worn by an operator 30 such that the operator's arms 32 can generally align with the powered arms 14, which are outboard of the operator's arms 32. The body portion 22 can be removably attached to the operator 30 such as by shoulder straps 34 and/or a harness 36 for example. The operator's arms 32 may or may not be directly connected (e.g., strapped) to the powered arms 14. In the example provided, the left and right powered arms 14 can be similar but generally mirrored in orientation. Accordingly, descriptions and reference numerals shown and described herein as being applied to one can be applied to the other. In the example provided, each powered arm 14 includes an upper arm portion 50 coupled to the body portion 22, a forearm portion 52 coupled to the upper arm portion 50, and a grip portion 54 at a distal end 56 of the forearm portion 52. Motors (not specifically shown) can be disposed in the body portion 22 and the powered arms 14 to move the powered arms 14. In the example provided, the upper arm portion 50 can pivot relative to the body portion 22 about a shoulder axis 58 and the forearm portion 52 can pivot relative to the upper arm portion 50 about an elbow axis 60. In the example provided, a proximate region 62 of the upper arm portion 50 can also rotate relative to a distal region 64 of the upper arm portion 50 about an upper arm axis 66.

In the example provided, the grip portion 54 is fixedly coupled to the distal end 56 of the forearm portion 52 for common movement therewith. The grip portion 54 includes a platform 110 and a grip handle 112. The platform 110 extends inboard from the distal end 56 of the forearm portion 52. The grip handle 112 is attached to a rear side 114 of the platform 110 and is configured to be gripped by the operator's hand 68. The control module 26 is configured to detect movement of the operator's arm 32 and/or hand 68 and operate the motors (not shown) to move the powered arm 14 according to the movement of the operator's arm 32 and/or hand 68. In the example provided, the grip handle 112 may include a sensor (not shown) configured to sense when the grip handle 112 is being gripped by the operator's hand 68. The control module 26 may be configured to prevent operation of the powered arms 14 if the operator 30 is not gripping both grip handles 112 at the same time. In the configuration shown in FIG. 1, an end effector, such as a hook 116 can be directly and fixedly mounted to a forward side 118 of the platform.

In the example provided, the operator's legs 70 generally align with the powered legs 18. The powered legs 18 are outboard of the operator's legs 70 and can be connected to the operator's legs 70 such as at the operator's feet 72 for example. Motors (not shown) can be disposed within the powered legs 18 and/or the body portion 22 and the control module 26 is configured to operate these motors to move the powered legs 18 according to movement of the operator's legs 70. While individual powered legs 18 are illustrated and described herein, other configurations can be used, such as wheels or continuous tracks for example. In another configuration, not specifically shown, the body portion 22 may be supported for movement by a track such as a gantry for example.

Figure 2:
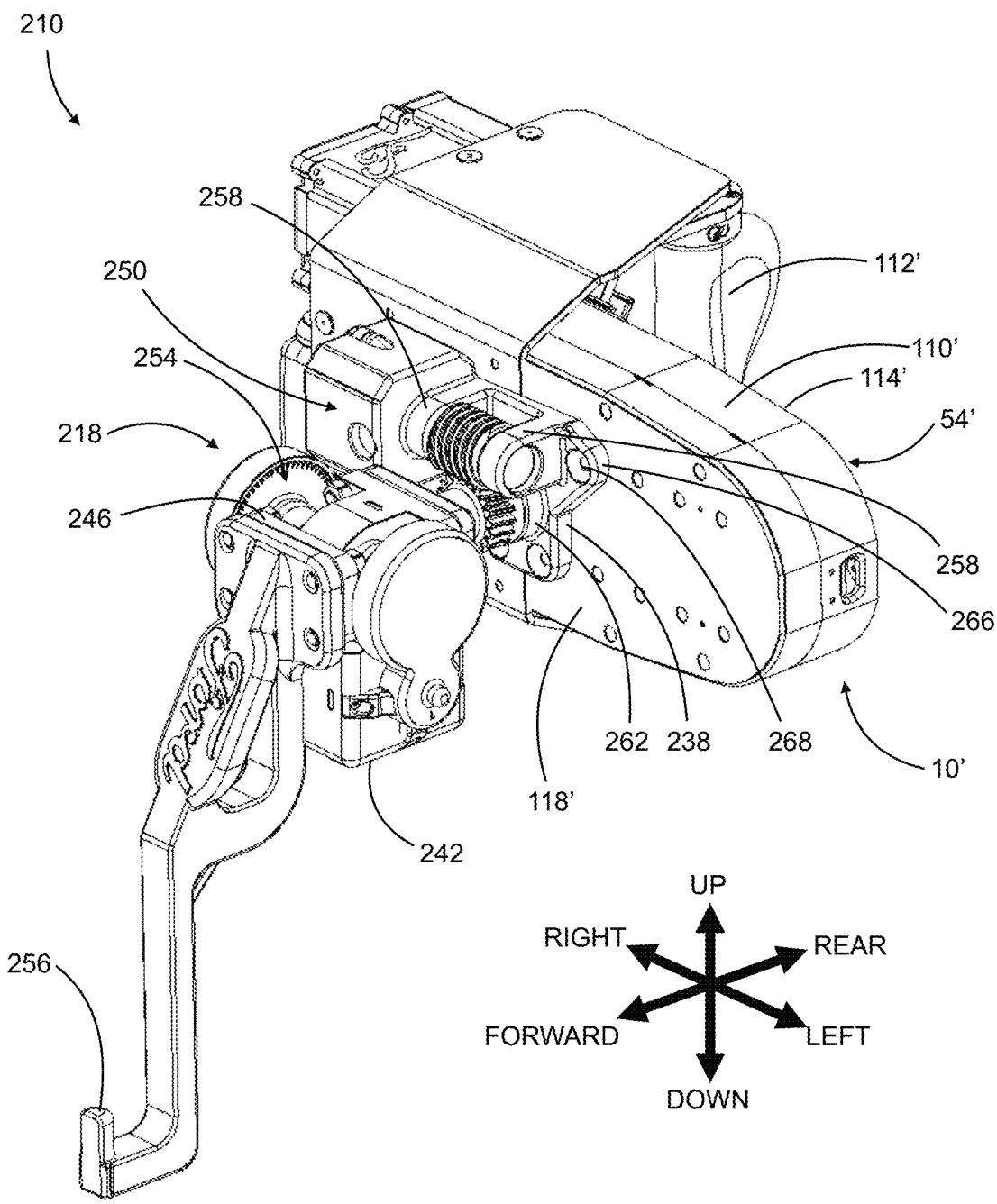
FIG. 2 is a front perspective view of an exoskeleton wrist component in accordance with the teachings of the present disclosure, illustrating the exoskeleton wrist component coupled to a grip portion of an arm of an exoskeleton similar to the exoskeleton of FIG. 1.
Figure 3:
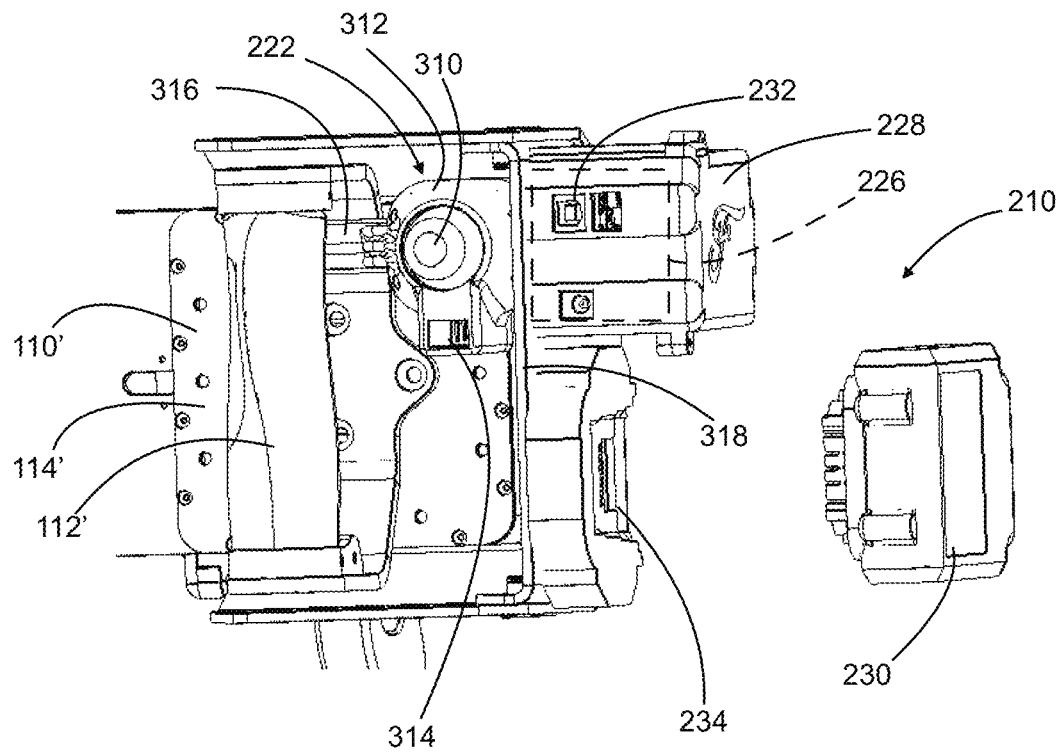
FIG. 3 is a rear partially-exploded perspective view of a portion of the exoskeleton wrist component of FIG. 2, illustrating an input device in accordance with the teachings of the present disclosure.

Referring to FIGS. 2 and 3, a component 210 and a grip portion 54' of an exoskeleton 10' are illustrated. The entirety of the exoskeleton 10' is not shown in FIGS. 2 and 3 but the exoskeleton 10' is similar to the exoskeleton 10 of FIG. 1 except as otherwise shown or described herein. Accordingly, similar features are denoted with similar but primed reference numerals and only differences are described in detail. The component 210 includes a wrist device 218 and an input device 222. In the example provided, the component 210 also includes a control module 226 in communication with the wrist device 218 and the input device 222, a removable power storage unit (e.g. a battery 230), and a battery mount 234 configured to provide power from the battery 230 to the control module 226, the wrist device 218 and the input device 222, though other configurations can be used.

In one alternative configuration, not specifically shown, the battery 230 and battery mount 234 may be omitted and the wrist device 218 and the input device 222 may be connected to the power storage unit 24 (FIG. 1) or an external power source (not shown). In another alternative configuration, not specifically shown, the control module 226 may be omitted and the wrist device 218 and the input device 222 may be in communication with the control module 26 (FIG. 1).

Returning to the example provided in FIG. 2, the wrist device 218 includes a wrist base structure 238, a wrist intermediate structure 242, an end effector support structure 246, a first driveline 250 and a second driveline 254. An end effector, such as a hook 256 can be mounted to the end effector support structure 246. The wrist base structure 238 is fixedly coupled to the forward side 118' of the platform 110'. The wrist base structure 238 includes a pair of input supports 258 and an output support 262. In the example provided, the wrist base structure 238 also includes a flange 266 that defines a plurality of mount bores 268 and the flange 266 is removably mounted to the forward side 118' by a plurality of fasteners (not shown) received in the mount bores 268, though other configurations can be used such as the wrist base structure 238 being integrally formed with the platform 110 or welded thereto for example.

Figure 5:
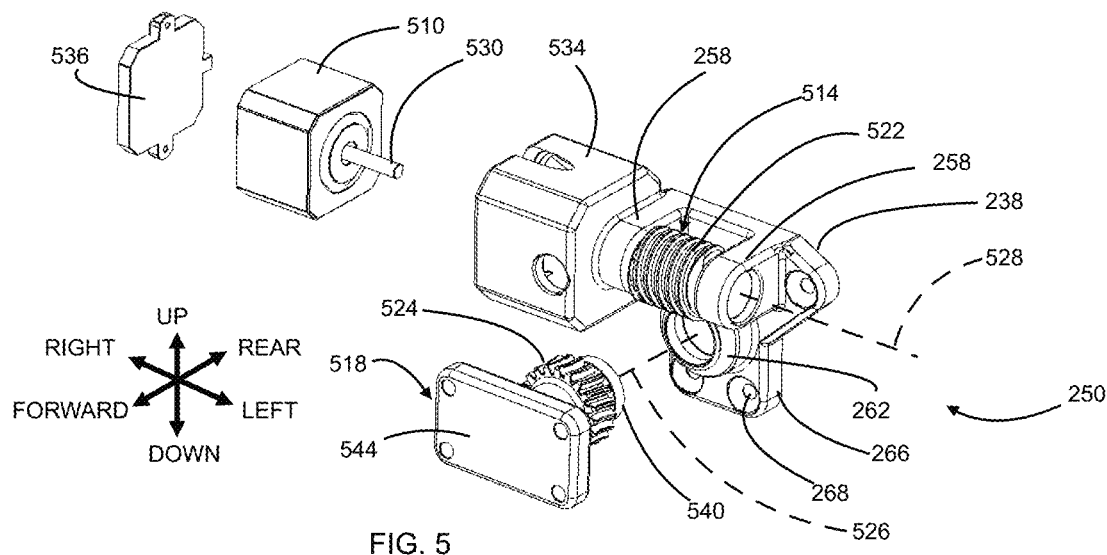
FIG. 5 is an exploded perspective view of a portion of the exoskeleton wrist component of FIG. 2, illustrating a first axis mechanism in accordance with the teachings of the present disclosure.

Referring to FIG. 5, the input supports 258 are spaced apart and extend forward from the flange 266. The first driveline 250 includes a first motor 510, a first gearset 514, and an output member 518. In the example provided, the first motor 510 is a stepper motor, though other types of motors can be used. In the example provided, the first gearset 514 includes a worm 522 meshingly engaged with a worm gear 524. The worm gear 524 is supported for rotation about a first axis 526. The worm 522 is supported by the input supports 258 for rotation relative thereto about a motor output axis 528. An output 530 of the first motor 510 is coupled to the worm 522 to rotate the worm 522. In the example provided, the first motor 510 is received in a housing 534 integrally formed with one of the input supports 258 and a cover 536 encloses the first motor 510 therein, though other configurations can be used such as attaching the first motor 510 to the platform 110' (FIG. 2) for example.

In the example provided, the first gearset 514 has a gear ratio that multiplies the torque output from the first motor 510. In the example provided, the worm 522 and the worm gear 524 permit the first gearset 514 to be self-locking, though other types of self-locking gearsets can be used. In an alternative configuration, not specifically shown, the first gearset 514 may be not self-locking such as including bevel gears for example. In another alternative configuration, not specifically shown, the first motor 510 can be oriented such that the motor output axis 528 is parallel to the first axis 526. While the example provided only includes two gears (e.g., the worm 522 and the worm gear 524), the first gearset 514 may include additional gears to achieve a desired gear ratio.

In an alternative configuration, not specifically shown, the first gearset 514 can include pulleys and belts or chains and sprockets instead of gears.

Returning to the example provided, the output member 518 includes a shaft portion 540 and a plate portion 544. In the example provided, the shaft portion 540 is received in and supported by the output support 262 for rotation relative to the flange 266 about the first axis 526. The worm gear 524 is coupled for common rotation with the shaft portion 540 about the first axis 526. The plate portion 544 is disposed at an end of the shaft portion 540 opposite the output support 262. The plate portion 544 is fixedly coupled to the wrist intermediate structure 242 (FIG. 6) for common rotation about the first axis 526. In the example provided, the plate portion 544 is removably coupled to a mating flange 610 (FIG. 6) of the wrist intermediate structure 242 such as by fasteners 612 (FIG. 6; e.g., bolts), though other configurations can be used such as being integrally formed therewith or welded thereto for example.

Figure 6:
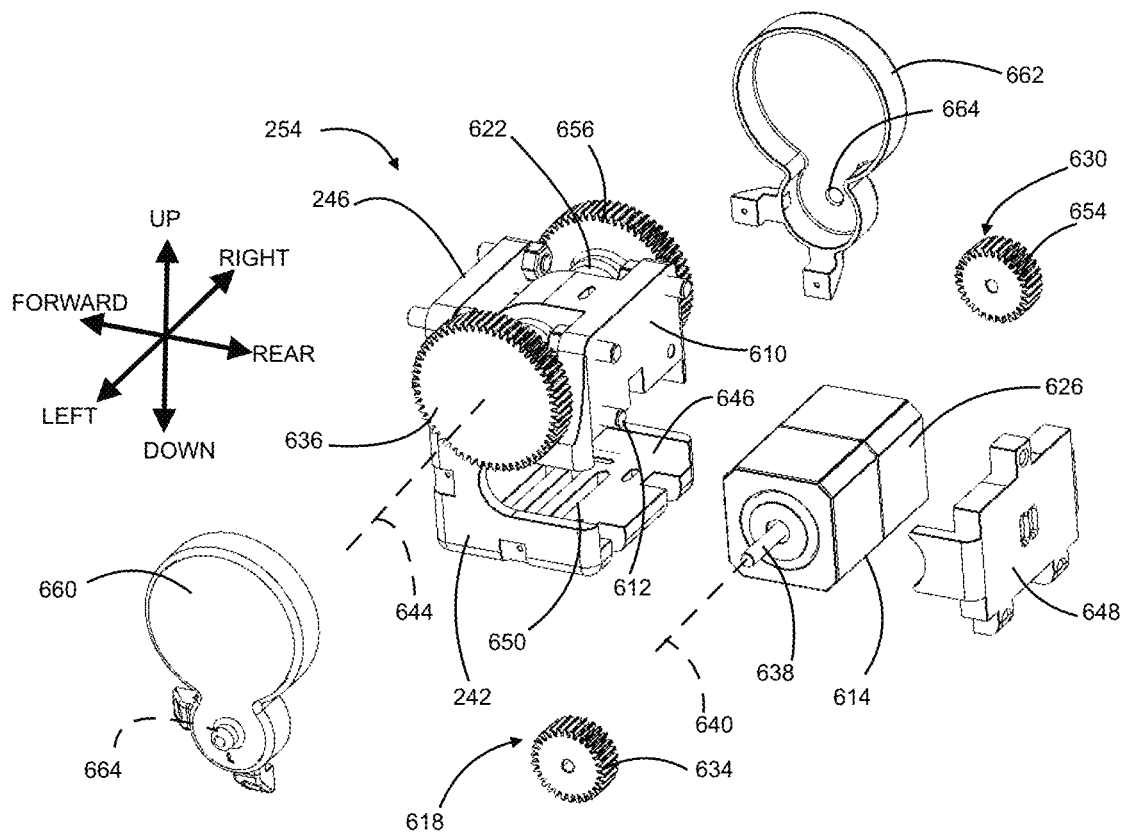
FIG. 6 is a partially exploded view of a portion of the exoskeleton wrist component of FIG. 2, illustrating a second axis mechanism in accordance with the teachings of the present disclosure.
Figure 7:
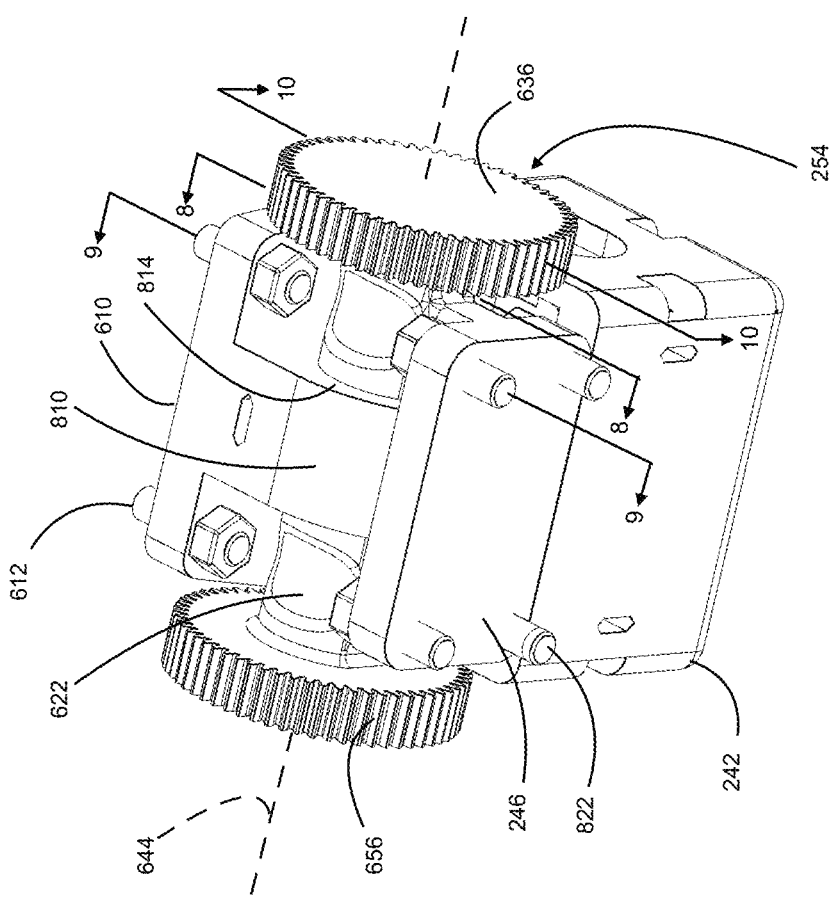
FIG. 7 is a perspective view of a portion of the second axis mechanism of FIG. 2.

Referring to FIGS. 6 and 7, the second driveline 254 is supported for rotation with the wrist intermediate structure 242 about the first axis 526 (FIG. 5). The second driveline 254 includes a second motor 614, a second gearset 618, and an output shaft 622. In the example provided, the second motor 614 is a stepper motor, though other types of motors can be used. In the example provided, the second driveline 254 may optionally include a third motor 626 and a third gearset 630. In the example provided, the third motor 626 is a stepper motor, though other types of motors can be used. In the example provided, the second gearset 618 includes an input gear 634 and an output gear 636 meshingly engaged to the input gear 634. The input gear 634 is coupled to an output 638 of the second motor 614 for rotation about a second motor axis 640. The output shaft 622 is supported by the wrist intermediate structure 242 for rotation relative thereto about a second axis 644 and is coupled to the output gear 636 for common rotation about the second axis 644. In the example provided the second motor axis 640 is parallel to the second axis 644, though other configurations can be used.

In the example provided, the wrist intermediate structure 242 defines a motor cavity 646 that receives the second and third motors 614, 626 and a cover 648 encloses the second and third motors 614, 626 therein. In the example provided, the wrist intermediate structure 242 may optionally define a plurality of apertures 650 open to the motor cavity 646 to provide cooling of the second and third motors 614, 626.

The third gearset 630 is similar to the second gearset 618 and includes an input gear 654 and an output gear 656 meshingly engaged with the input gear 654. The input gear 654 of the third gearset 630 is coupled to an output (not specifically visible in the figures) of the third motor 626 for rotation about the second motor axis 640. The output gear 656 of the third gearset 630 is coupled to the output shaft 622 for common rotation about the second axis 644. In the example provided, the second motor 614 and the third motor 626 are similar motors and the second gearset 618 and the third gearset 630 have similar gear ratios. In the example provided, the input gears 634, 654 are disposed on opposite lateral sides of the wrist intermediate structure 242.

In an alternative configuration, not specifically shown, the second gearset 618 and, if included, the third gearset 630 can have additional gears to achieve a desired gear ratio. In another alternative configuration, not specifically shown, the second gearset 618 and, if included, the third gearset 630 can include pulleys and belts or chains and sprockets instead of gears. In the example provided, the second gearset 618 and the third gearset 630 are not self-locking gears, though self-locking gears can be used.

In the example provided, a pair of driveline covers 660, 662 are attached to the wrist intermediate structure 242 and surround the input gears 634, 654 and the output gears 636, 656. In the example provided, each cover 660, 662 defines a recess 664 that receives and supports the end of each respective output 638 (only one of which is visible in FIG. 6) of the second and third motors 614, 626, though other configurations can be used.

Figure 8:
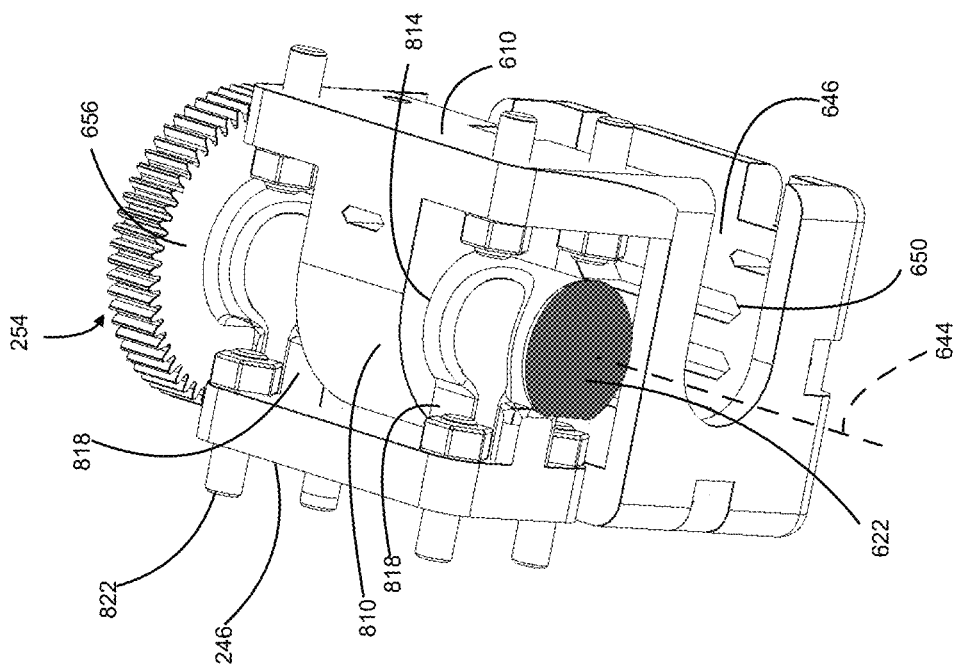
FIG. 8 is a cross-sectional view of the portion of the second axis mechanism of FIG. 7, taken along line 8-8 shown in FIG. 7.
Figure 10:
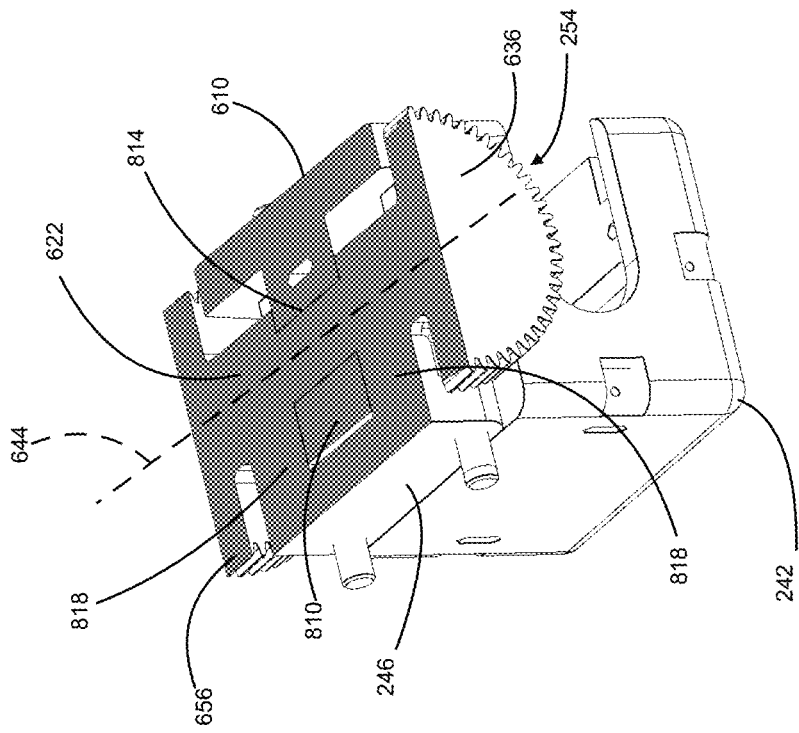
FIG. 10 is a cross-sectional view of the portion of the second axis mechanism of FIG. 7, taken along line 10-10 shown in FIG. 7.
Figure 9:
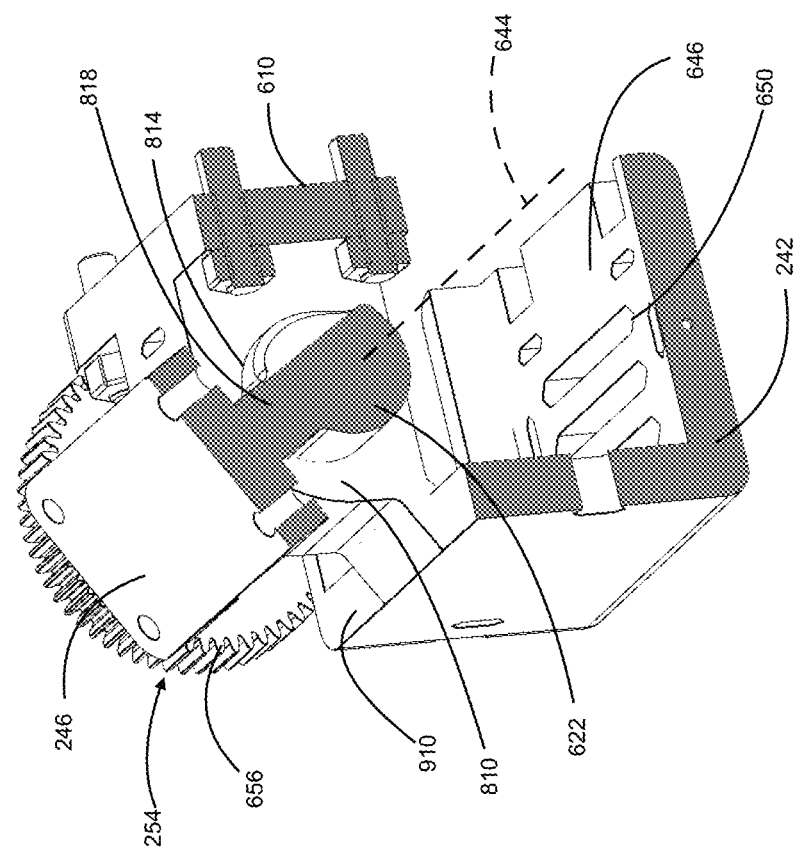
FIG. 9 is a cross-sectional view of the portion of the second axis mechanism of FIG. 7, taken along line 9-9 shown in FIG. 7 but illustrating an end effector mount rotated in accordance with the teachings of the present disclosure.

Referring to FIGS. 8-10, the wrist intermediate structure 242 includes a support 810 that defines a bore 814 through which the output shaft 622 of the second driveline 254 extends. The end effector support structure 246 is fixedly coupled to the output shaft 622 for common rotation about the second axis 644 via a pair of stanchions 818 located on opposite sides of the support 810. The end effector support structure 246 may be configured to permit the end effector (e.g., hook 256; FIG. 2) to be removably mounted thereto such as via fasteners 822 (e.g., bolts) or the end effector (e.g., hook 256; FIG. 2) may be non-removably removably attached thereto, such as being integrally formed therewith or welded thereto for example.

Referring specifically to FIG. 9, in the example provided, the wrist intermediate structure 242 can also optionally define a positive stop surface 910 that is configured to engage the end effector support structure 246 to prevent rotation thereof beyond a predetermined range. In an alternative configuration, not specifically shown, the motor cavity 646 is offset further rearward, such as being entirely rearward of the output shaft 622, such that the range of rotation for the end effector support structure 246 is increased.

Figure 4:
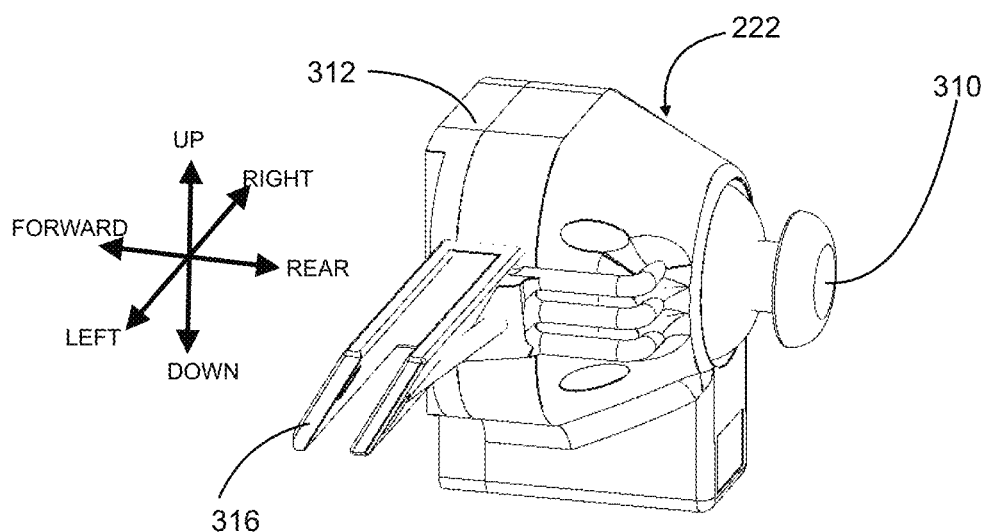
FIG. 4 is a perspective view of the input device of FIG. 3.

Referring to FIGS. 3 and 4, the input device 222 is mounted to the rear side 114' of the platform 110' proximate to the grip handle 112'. The input device 222 is positioned such that the operator 30 (FIG. 1) can manipulate the input device 222 with the fingers or thumb of his or her hand 68 (FIG. 1) without removing that hand 68 (FIG. 1) from the grip handle 112'. For example, the input device 222 may be less than 10 centimeters from the grip handle 112'.

In the example provided, the input device 222 includes a joystick 310 supported by a housing 312. The housing 312 is mounted to the rear side 114' of the platform 110'. In the example provided, the housing 312 includes a bracket 316 that can couple the housing 312 to the platform 110', though other configurations can be used, such as the housing being integrally formed with the platform 110', welded thereto, or affixed with fasteners for example.

The joystick 310 can be articulated in up, down, left, and right directions. In an alternative configuration, not specifically shown, the joystick 310 can be replaced by other inputs such as up, down, left, and right buttons for example. The joystick 310 is in communication with the control module 226 and the control module 226 is configured to operate the motors 510, 614, 626 (FIGS. 5 and 6) based on movement of the joystick 310. For example, the control module 226 can be configured to operate the first motor 510 (FIG. 5) in a one rotational direction when the joystick 310 is articulated to the left and to operate the first motor 510 (FIG. 5) in the opposite rotational direction when the joystick 310 is articulated to the right. Similarly, the control module 226 can be configured to operate the second and third motors 614, 626 (FIG. 6) simultaneously in a first manner to rotate the output shaft 622 (FIG. 7) in a first rotational direction when the joystick 310 is articulated up and an opposite rotational direction when articulated down. In the example provided, the input device 222 may optionally include an on/off switch 314 or button that can be configured to turn the component 210 on and off.

In optional alternative configurations, an additional input source such as the joystick 310 being pressed or one or more buttons (not shown) can be included and the control module 226 can be configured to initiate a secondary function in response. Some non-limiting examples of secondary functions can include rotating the shaft portion 540 or the output shaft 622 to a predetermined rotational position, opening or closing a gripping end effector (not shown), locking the end effector (e.g., hook 256; FIG. 2) in place, operating an actuator or process external to the exoskeleton 10'.

In the example provided, the control module 226 is disposed within a case 228 that is mounted to an end 318 of the platform 110', though other configurations can be used. The control module 226 may optionally have one or more ports or interfaces 232 that can be accessible from the exterior of the case 228. In the example provided, the battery mount 234 is also mounted to the end 318 of the platform 110', though other configurations can be used. The battery 230 can be any suitable type of power storage device and can be configured to quickly and easily be attached and removed from the battery mount 234 for replacement or recharging when depleted.

Accordingly, the component 210 permits the end effector (e.g., hook 256) attached to the platform 110' to rotate with two additional degrees of freedom relative to the platform 110'.

In this application, including the definitions below, the term "module" or the term "controller" may be replaced with the term "circuit". The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An exoskeleton component comprising:
a wrist base structure;
a wrist intermediate structure supported by the wrist base structure;
an end effector support structure supported by the wrist intermediate structure;
a first driveline supported by the wrist base structure and including a first motor and a first output member, the first output member being disposed about a first axis, the first output member being coupled to the wrist intermediate structure for common rotation about the first axis relative to the wrist base structure, the first motor being drivingly coupled to the first output member to rotate the first output member about the first axis;
a second driveline supported by the wrist intermediate structure and including a second motor and a second output member disposed about a second axis that is transverse the first axis, the second output member being coupled to the end effector support structure for common rotation about the second axis relative to the wrist intermediate structure, the second motor being drivingly coupled to the second output member to rotate the second output member about the second axis;
an input device coupled to the wrist base structure; and
a controller in electrical communication with the first motor, the second motor, and the input device and configured to receive input signals from the input device and to control the first motor and the second motor in response to the input signals,
wherein the second driveline is between the first driveline and the end effector support structure.

2. The exoskeleton component according to claim 1, further comprising a power storage device coupled to the wrist base structure and connected for electrical communication with the controller, the first motor, and the second motor.

3. The exoskeleton component according to claim 1, wherein the input device includes a joystick, a button, a switch, or combinations thereof.

4. The exoskeleton component according to claim 1, wherein the end effector support structure includes an end effector mount configured to releasably connect to an end effector.

5. The exoskeleton component according to claim 1, further comprising an end effector coupled to the end effector support structure.

6. The exoskeleton component according to claim 1, wherein at least one of the first driveline and the second driveline includes a self-locking gearset.

7. The exoskeleton component according to claim 1, wherein the first driveline includes a worm and a worm gear, the worm being coupled to an output of the first motor, the worm gear being meshingly engaged with the worm and coupled to the first output member.

8. The exoskeleton component according to claim 1, further comprising a third driveline including a third motor drivingly coupled to the second output member to rotate the second output member about the second axis.

9. The exoskeleton component according to claim 1, wherein the second driveline includes an input gear and an output gear, the input gear of the second driveline being drivingly coupled to an output of the second motor, the output gear of the second driveline being meshingly engaged to the input gear of the second driveline and coupled to the end effector support structure for common rotation about the second axis.

10. The exoskeleton component according to claim 9, further comprising a cover, the cover being coupled to the wrist intermediate structure and enclosing the input gear of the second driveline and the output gear of the second driveline.

11. The exoskeleton component according to claim 1, further comprising a grip handle configured to be gripped by a hand of an operator, the grip handle being disposed proximate the input device to permit the operator to engage the input device with the hand while also gripping the grip handle with the hand.

12. The exoskeleton component according to claim 11, wherein the grip handle is disposed about a third axis that is transverse the first axis and the second axis.

13. The exoskeleton component according to claim 1, wherein the controller is supported for movement with the wrist base structure.

14. The exoskeleton component according to claim 1, further comprising an exoskeleton arm coupled to the wrist base structure for movement therewith, the exoskeleton arm being configured to be attached to an arm of an operator form movement therewith.

15. An exoskeleton component for an exoskeleton arm including a grip handle coupled to the exoskeleton arm and configured to be gripped by a hand of an operator, the exoskeleton component comprising:
- a wrist base structure configured to be coupled to and supported by the exoskeleton arm for movement therewith;
- a wrist intermediate structure supported by the wrist base structure;
- an end effector support structure supported by the wrist intermediate structure, wherein the end effector support structure is located on a side of the wrist base structure that is opposite the grip handle when the wrist base structure is coupled to the exoskeleton arm;
- a first driveline supported by the wrist base structure and including a first motor and a first gearset, the first gearset drivingly coupled to the first motor and configured to rotate the wrist intermediate structure relative to the wrist base structure about a first axis upon operation of the first motor;
- a second driveline supported by the wrist intermediate structure and including a second motor and a second gearset, the second gearset drivingly coupled to the second motor and configured to rotate the end effector support structure relative to the wrist intermediate structure about a second axis upon operation of the second motor, the second axis being transverse the first axis;
- an input device coupled to the exoskeleton arm and disposed proximate the grip handle; and
- a controller configured to receive input signals from the input device and to control the first motor and the second motor to operate the first motor and the second motor in response to the input signals.

16. The exoskeleton component according to claim 15, wherein the first motor is supported for movement with the exoskeleton arm and the second motor is supported by the wrist intermediate structure for movement therewith.

17. The exoskeleton component according to claim 15, wherein the first gearset includes a worm and a worm gear, the worm is configured to transfer torque from the first motor to the worm gear and the worm gear is configured to rotate the wrist intermediate structure about the first axis.

18. The exoskeleton component according to claim 15, wherein the second motor is supported by the wrist intermediate structure.

19. The exoskeleton component according to claim 15, wherein the second driveline further includes a third motor and a third gearset, the third gearset drivingly coupled to the third motor and configured to rotate the end effector support structure relative to the wrist intermediate structure about the second axis upon operation of the third motor.

20. The exoskeleton component according to claim 15, further comprising a power storage device coupled to the exoskeleton arm and connected for electrical communication with the controller, the first motor, and the second motor.

* * * * *